US011619489B2

(12) United States Patent
Ziebart et al.

(10) Patent No.: US 11,619,489 B2
(45) Date of Patent: Apr. 4, 2023

(54) METHOD FOR VISUALIZING AN INCLINATION OF A MOTOR VEHICLE IN THE MOTOR VEHICLE

(71) Applicant: Volkswagen Aktiengesellschaft, Wolfsburg (DE)

(72) Inventors: Sascha Ziebart, Calberlah (DE); André Heinrichs, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 95 days.

(21) Appl. No.: 17/233,039

(22) Filed: Apr. 16, 2021

(65) Prior Publication Data
US 2021/0325181 A1    Oct. 21, 2021

(30) Foreign Application Priority Data

Apr. 16, 2020  (DE) ..................... 10 2020 204 862.2
Jul. 23, 2020  (DE) ..................... 10 2020 209 329.6

(51) Int. Cl.
| G01C 9/06 | (2006.01) |
| B60Q 3/80 | (2017.01) |
| B60Q 3/70 | (2017.01) |
| B60Q 5/00 | (2006.01) |
| B60Q 9/00 | (2006.01) |

(52) U.S. Cl.
CPC ............... *G01C 9/06* (2013.01); *B60Q 3/70* (2017.02); *B60Q 3/80* (2017.02); *B60Q 5/00* (2013.01); *B60Q 9/00* (2013.01); *G01C 2009/066* (2013.01)

(58) Field of Classification Search
None
See application file for complete search history.

(56) References Cited

U.S. PATENT DOCUMENTS

| 6,654,024 B1 | 11/2003 | Völkel |
| 7,463,953 B1 | 12/2008 | Lee et al. |
| 10,926,634 B2 | 2/2021 | Wild et al. |
| 2008/0319589 A1 | 12/2008 | Lee et al. |
| 2019/0139286 A1* | 5/2019 | Shimoda ............... G08G 1/0962 |
| 2020/0326221 A1* | 10/2020 | Arreaza ................. G01F 22/00 |

FOREIGN PATENT DOCUMENTS

| CN | 103776421 A * | 5/2014 | ............... B60Q 9/00 |
| DE | 19944067 A1 | 3/2001 | |
| DE | 102008027087 A1 | 12/2008 | |
| DE | 102015210887 A1 | 9/2016 | |

(Continued)

*Primary Examiner* — Fekadeselassie Girma
(74) *Attorney, Agent, or Firm* — Muncy, Geissler, Olds & Lowe, P.C.

(57) ABSTRACT

A method for visualizing an inclination of a motor vehicle in the motor vehicle, in which the inclination of the motor vehicle is measured and made visible in the interior of the motor vehicle. The inclination is made visible by interior lighting of the motor vehicle. At least one virtual plane is formed, which intersects the motor vehicle horizontally when the latter is in a horizontal position and serves as a reference plane for displaying the inclination. Changes in the inclination of the motor vehicle are modeled dynamically by the interior lighting by the sequential and/or parallel activation of illuminants of the interior lighting.

17 Claims, 10 Drawing Sheets

(56) References Cited

FOREIGN PATENT DOCUMENTS

| | | | |
|---|---|---|---|
| DE | 102018005117 A1 * | 12/2018 | |
| DE | 102018216409 A1 | 3/2020 | |
| JP | 2013136313 A * | 7/2013 | |
| JP | 2016049868 A * | 4/2016 | ............. B60K 35/00 |
| JP | 2016183919 A * | 10/2016 | ....... B60G 17/01908 |
| JP | 2017206140 A | 11/2017 | |
| WO | WO-0031502 A1 * | 6/2000 | ............... G01C 9/06 |
| WO | WO-2014132680 A1 * | 9/2014 | ............. B60K 35/00 |
| WO | WO2016107770 A1 | 7/2016 | |

\* cited by examiner

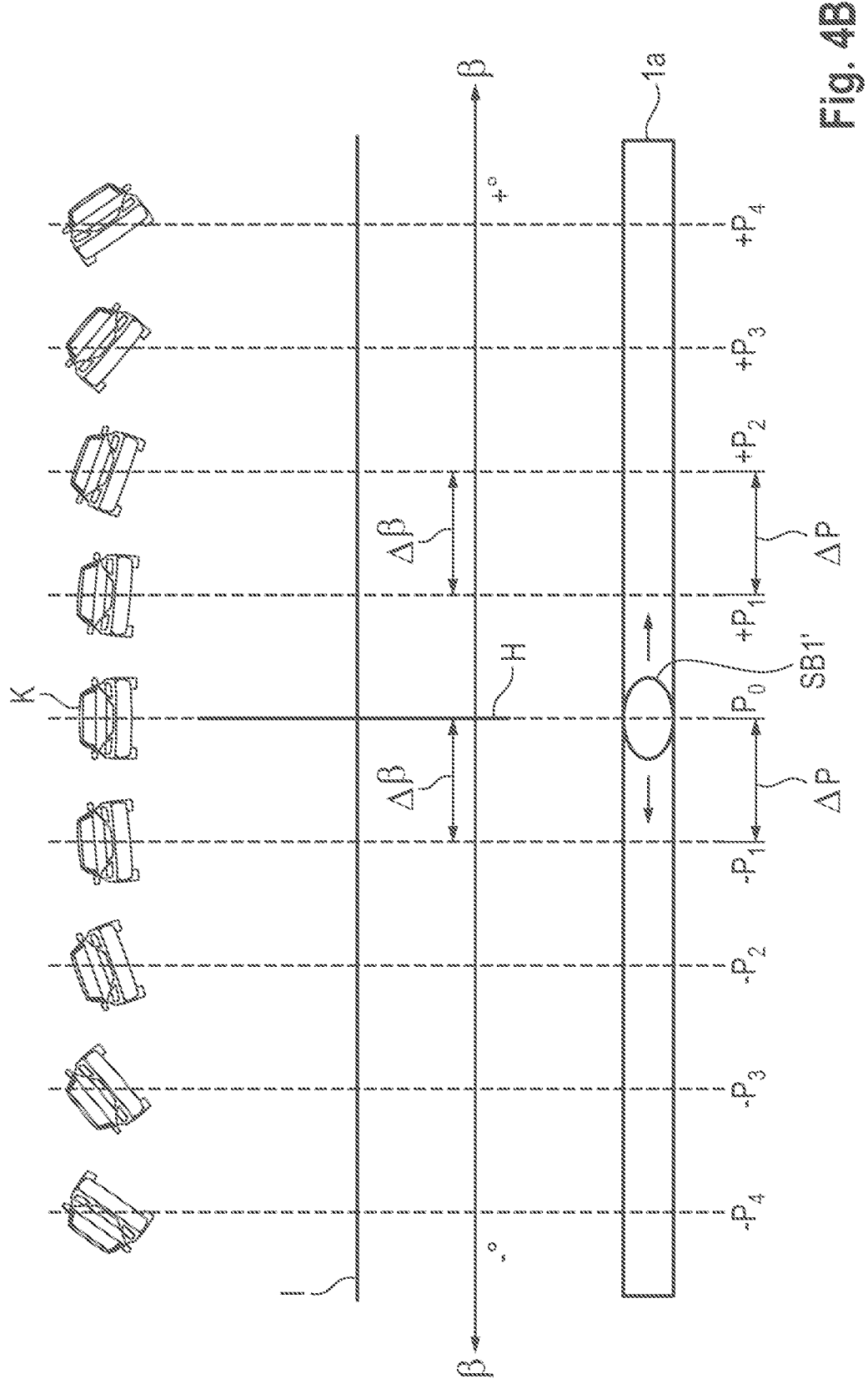

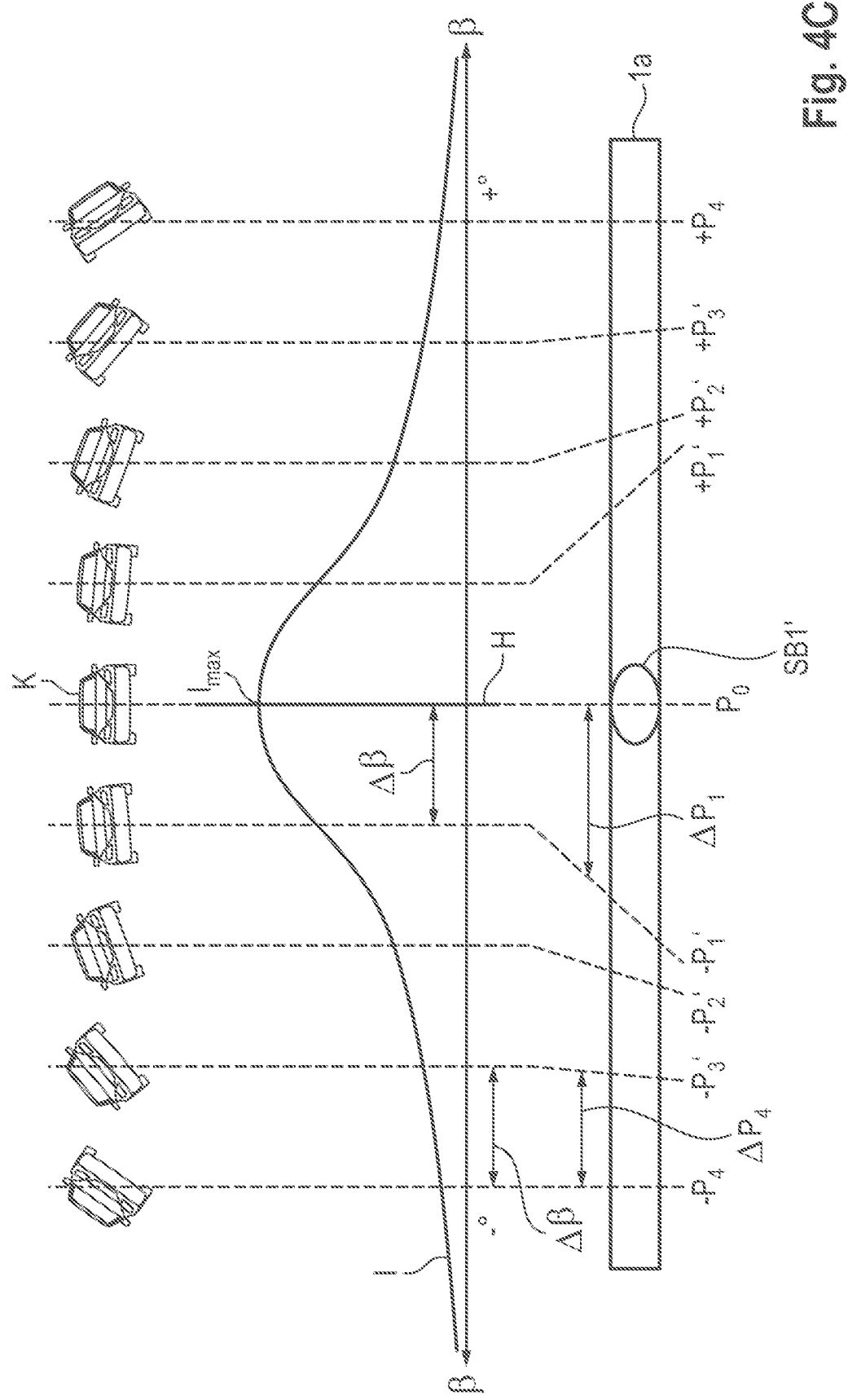

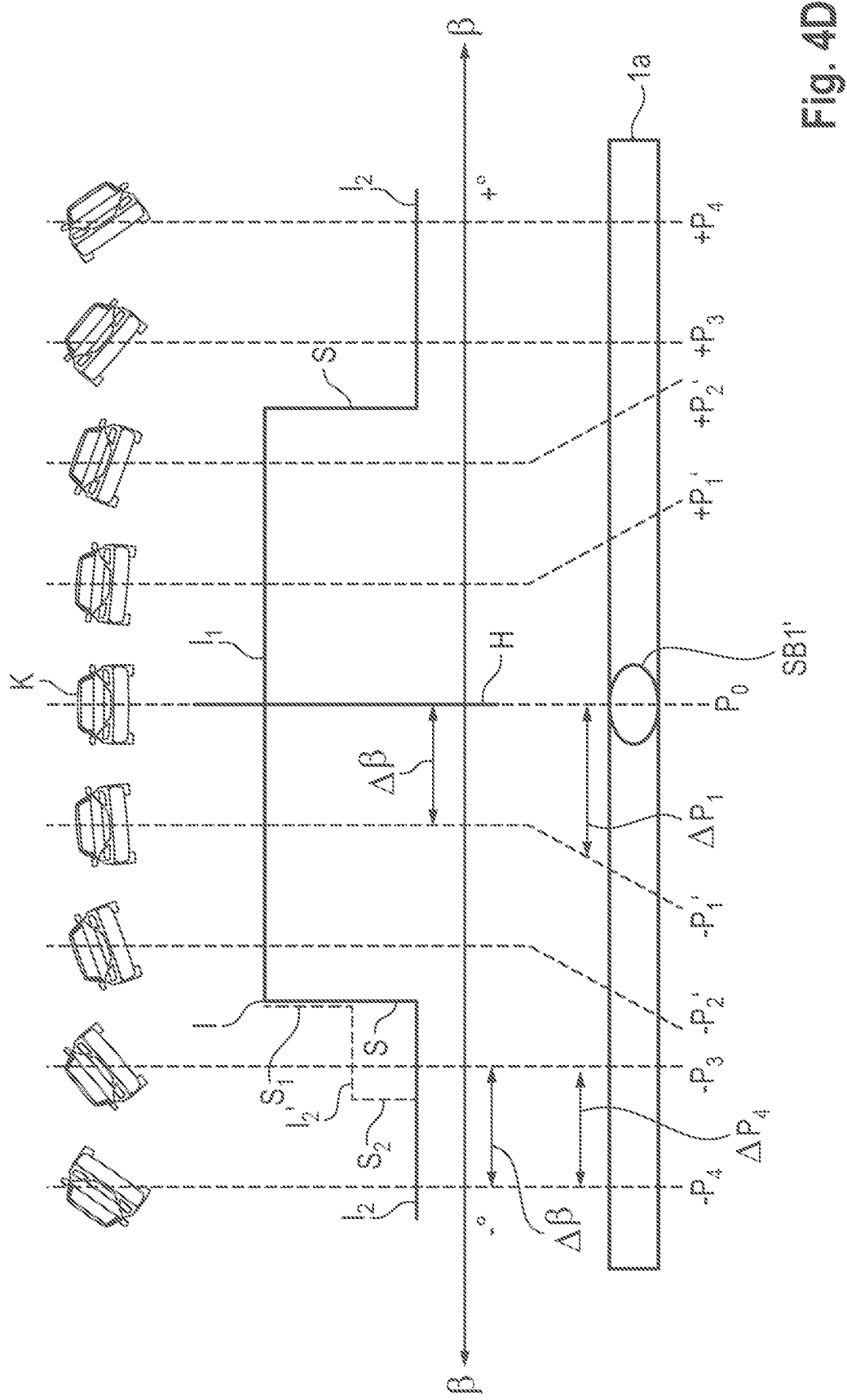

METHOD FOR VISUALIZING AN INCLINATION OF A MOTOR VEHICLE IN THE MOTOR VEHICLE

This nonprovisional application claims priority under 35 U.S.C. § 119(a) to German Patent Application No. 10 2020 204 862.2, which was filed in Germany on Apr. 16, 2020 and to German Patent Application No. 10 2020 209 329.6, which was filed in Germany on Jul. 23, 2020 and which are herein incorporated by reference.

BACKGROUND OF THE INVENTION

Field of the Invention

The present invention relates to a method for making an inclination of a motor vehicle visible in the motor vehicle. The invention also relates to a motor vehicle for carrying out the method.

Description of the Background Art

DE 10 2015 210 887 A1, which is incorporated herein by reference, discloses a method for displaying a vehicle acceleration, in which the acceleration of the motor vehicle is detected and, in response thereto, interior lighting is generated in the interior of the vehicle. In particular, a lighting parameter of the interior lighting of the vehicle is changed as a function of the detected acceleration. Thereby, the lighting parameter, which may include a luminous intensity or a color of the interior lighting, is changed in such a direction that is oriented counter to the direction of acceleration. The interior lighting comprises light-emitting diodes arranged adjacent to one another, which are designed as a so-called LED light strip and which extend horizontally in the vehicle, for example along the dashboard.

DE 10 2008 027 087 A1, which corresponds to U.S. Pat. No. 7,463,953, which is incorporated herein by reference, discloses a method for determining an angle of inclination of a vehicle, in which an actual angle of inclination of the vehicle is calculated as a function of measured acceleration readings. Further, the magnitude of a vector sum of the acceleration of the vehicle in the direction of an X-axis, Y-axis, and Z-axis is calculated. In addition, a compensated angle of inclination is calculated as a function of the current angle of inclination calculated from measured acceleration values, at least one previous angle of inclination, and the magnitude of the vector sum of accelerations in the direction of said axes. The at least one preceding angle of inclination is used to calculate the compensated angle of inclination when the magnitude of the vector sum of the accelerations in the direction of said axes is substantially different from the magnitude of the acceleration due to gravity. The angle of inclination information is indicated by showing roll angle information and pitch angle information on a display in the interior of the vehicle.

In today's motor vehicles, ambient lighting is increasingly being used as a component of interior lighting. Ambient lighting and its illuminants are primarily used to create a high-quality and pleasant feeling in the interior. The functions of reading or search lighting are usually adopted by other illuminants.

SUMMARY OF THE INVENTION

It is therefore an object of the present invention to provide an extraordinary impression to the passenger with the aid of interior lighting. Furthermore, an object of the present invention is to provide a suitable motor vehicle for carrying out the method.

The invention is based on a method for visualizing an inclination of a motor vehicle in a motor vehicle. In the method, the inclination of the motor vehicle is measured and made visible in the interior of the motor vehicle. The inclination of the motor vehicle within the space is thereby preferably measured in relation to the perpendicular. In particular, it is derived from the acceleration due to gravity in the direction of the center of gravity.

According to the invention, it is now proposed that the inclination be made visible by means of interior lighting of the motor vehicle. At least one virtual plane is formed which intersects the motor vehicle horizontally when it is in a horizontal position. This plane is consequently oriented orthogonally to the perpendicular in the direction of the earth's center. It can "cut through" the vehicle at a certain, fixed height (for example, lower edge of window, arm rests, etc.).

In the method, this plane serves as a reference plane for displaying the inclination, wherein the interior lighting is used to dynamically model changes in the inclination of the motor vehicle by means of sequential and/or parallel (i.e. simultaneous) activation of illuminants of the interior lighting.

A method with the above features creates the conditions for visualizing changes in the inclination of the motor vehicle in the interior in a very impressive manner for the vehicle occupant. Very expediently, the method can be carried out using ambient lighting.

The inclination of the motor vehicle can be made visible in the manner of a spirit level showing an inclination. Thus, the movement of an air bubble in a fluid of a spirit level is modeled by at least one visualization area, which is produced by activating the illuminants. If the aforementioned virtual plane inclines, which in this case is coupled in terms of movement to the motor vehicle, then this visualization area moves in a manner analogous to the air bubble, counter to the direction of inclination of the virtual plane.

By such a further development of the method, the change in inclination can be displayed for the vehicle occupant in a very intuitive and easily understandable manner.

It is also conceivable that the visualization of the inclination of the motor vehicle is modeled on the movement of a virtual fluid resting on the virtual plane and surrounded by an additional, virtual wall.

In this case, the fluid, which changes position when the virtual plane coupled in terms of movement with the motor vehicle changes its inclination, is modeled by at least one visualization area produced by sequential and/or simultaneous activation of illuminants of the interior lighting. The visualization area moves in the direction of inclination of the virtual plane towards the virtual wall and/or collects in the area of the virtual wall.

Preferably, the speed of movement of the above visualization areas can be proportional to the inclination and/or gradient of the change in inclination.

With regard to the visualization area, it is conceivable that this can be formed by a luminous and/or colored highlighted area. In this way, the visualization area is clearly visible. In addition, energy can be saved in this way since the illuminants of the interior lighting outside the visualization area are either not activated or only activated with lower intensity.

Alternatively, however, it is also conceivable that the visualization area can be formed by a non-luminous area.

This may contribute to the vehicle occupant constantly seeing a large part of the interior lighting illuminated.

In order to prevent the interior lighting from appearing unsteady to the vehicle occupant in spite of constant, minimal changes in the inclination of the motor vehicle, it is proposed that the illuminants be only activated when a certain first inclination limit value is exceeded.

According to a further development of the method, it is proposed that, in the case of a change in inclination of the virtual plane coupled in terms of movement to the motor vehicle exceeding a certain gradient, a sloshing effect of the virtual fluid impinging against the virtual wall is modeled by activating the illuminants of the interior lighting.

In this way, a particularly impressive effect can be displayed when the inclination of the motor vehicle is shown to the vehicle occupant.

Here it is conceivable, for example, that the illuminants of the interior lighting are activated in such a way that initially at least one visualization area moves in the direction of inclination, expands at the inclined end of the interior lighting (basically bounces against the virtual wall) and at least one visualization area is moved back again in the direction counter to the direction of inclination over a short partial length of the interior lighting (i.e. basically bounces off the virtual wall).

An impressive display of a change in inclination in a motor vehicle can be further enhanced if the virtual fluid is modeled as a viscous (i.e., thick) fluid.

For the purpose of visualizing an inclination as described above, corresponding physical models can be used in the event of an inclination or change in inclination, for example in the form of stored characteristic diagrams, which reflect the behavior of an air bubble in a tube filled with fluid or a viscous fluid resting in a tub. Such physical models can preferably be stored in an evaluation and control unit that controls the illuminants of the interior lighting.

A further possibility of a very intuitive and easily understandable visualization of an inclination or change in inclination in the interior of the motor vehicle is achieved if the interior lighting serves to display the at least one virtual horizontal plane as a plane that is decoupled in terms of movement from inclination movements (i.e. rolling and pitching movements) of the motor vehicle. This can be done in such a way that, if the motor vehicle is not inclined, the interior lighting is divided horizontally by the virtual plane into a partial area located above the plane and a partial area located below the plane. In this case, the partial areas are displayed differently. This can be realized, for example, by the partial areas having a different color or brightness. For example, it is conceivable that a partial area above the defined virtual plane is illuminated in blue, while all the illuminants of the interior lighting below the virtual plane are illuminated in red.

A dividing line formed by the virtual plane between the partial areas is then changed in its position relative to the interior lighting when the motor vehicle is inclined.

In an advantageous further development of this idea, it is conceivable that the interior lighting can be used to display multiple virtual, horizontal planes as planes decoupled in terms of movement from inclination movements of the motor vehicle. These can then be "stacked", for example, at a defined distance from one another (for example, approx. ten centimeters).

According to a further development of the method, it is further proposed that the visualization of the inclination of the motor vehicle can be acoustically accompanied. For example, it is conceivable that when the motor vehicle is oriented horizontally, a sound is generated with a specific, audible volume and frequency. When the motor vehicle is inclined, the volume and/or frequency of this sound can be changed in accordance with the inclination. For example, it is possible to raise the sound at least in its frequency when the motor vehicle is on an upward slope and to lower its frequency when the vehicle is on a downward slope.

A highly useful embodiment of the method proposes that the relationship between an inclination of the motor vehicle and the visualization of the inclination by the interior lighting is non-linear. In other words, the sensitivity of the inclination display to changes in the vehicle's inclination describes a nonlinear progression.

Indeed, it has proven to be a technical challenge to visualize a wide range of angles of inclination on the one hand, but to produce as impressive an customer experience as possible on the other.

If small angles of inclination are already made clearly visible to the customer, the visualization of the inclination or its display already reaches its end stop at medium angles of inclination, so that further inclinations can no longer be made visible. If, however, a wide range of vehicle inclinations can be indicated, the customer will not be able to see the inclination or its display at small and medium inclinations, or will hardly be able to see it at all.

The above-mentioned embodiment of the method creates the conditions for meeting both objectives.

In this context, it is very advantageous if an intensity in the visualization of the inclination of the motor vehicle by the interior lighting decreases in the direction of an increasing inclination of the motor vehicle, starting from a maximum of the intensity when the motor vehicle is in a horizontal position (center position). In this way, the above-mentioned conflict of objectives can be optimally resolved.

With such a method, it is conceivable that the decrease in intensity is continuous, at least in some areas. Such a design has the advantage that the method of nonlinear visualization of changes in inclination or the change in the display is hardly noticeable to the customer.

However, it is also conceivable, alternatively or additionally, that the decrease in intensity takes place in steps, at least in some areas. The continuous and stepped reductions in intensity can also be combined with each other.

As initially mentioned, the present invention is also intended to provide a motor vehicle for carrying out the method.

Such a vehicle has interior lighting in the passenger compartment, which comprises at least one row of a plurality of horizontally aligned illuminants arranged next to one another. At least one control unit is provided for activating the illuminants as a function of values measured by at least one sensor.

According to the invention, the vehicle is characterized in that an inclination value of the motor vehicle can be detected by the at least one sensor, and illuminants of the interior lighting can be controlled sequentially and/or in parallel as a function of the detected inclination in such a way that at least one visualization area, which changes when the inclination changes, is produced. A change in the visualization area includes both a local change and a change in size and shape.

A further development of the motor vehicle can be done by the interior lighting comprising multiple rows of a plurality of horizontally aligned illuminants arranged next to one another. The interior lighting is thus designed in such a way that a matrix-like arrangement of the illuminants results.

Such a further development provides the prerequisite for being able to properly display all the visual effects mentioned in the method.

An impressive display of the effects is also provided if the interior lighting is arranged at least along an interior trim of the front doors and along a dashboard.

In order to be able to implement the aforementioned acoustic accompaniment of the visualization, it is proposed that at least one acoustic output device is present in the interior of the motor vehicle, which can be controlled by at least one control unit as a function of values measured by the at least one sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4B shows an illustration of a method in which the relationship between an inclination of the motor vehicle and the visualization of the inclination by interior lighting is linear, FIG. 4C shows an illustration of a method in which the relationship between an inclination of the motor vehicle and the visualization of the inclination by interior lighting is nonlinear, in a first variant, FIG. 4D shows an illustration of a method in which the relationship between an inclination of the motor vehicle and the visualization of the inclination by interior lighting is nonlinear, in a second variant.

DETAILED DESCRIPTION

Figure 1:
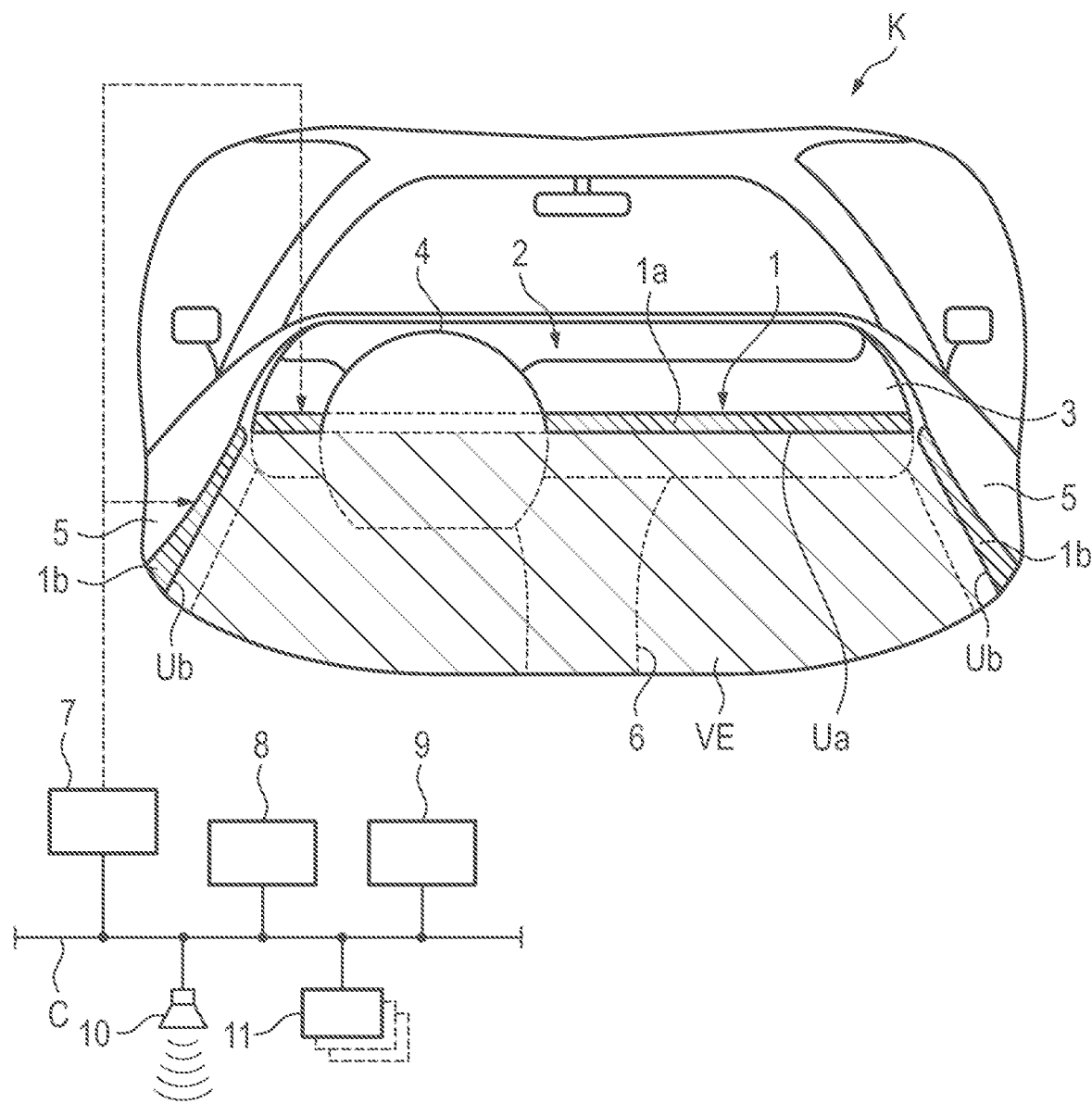
FIG. 1 shows a motor vehicle adapted for carrying out the method, in the area of its cockpit.

Reference is first made to FIG. 1. This shows a motor vehicle K which is adapted and suitable for carrying out the method according to the invention. An area in a cockpit 2 of the motor vehicle K is shown. In this area, a dashboard 3 is apparent, which is laterally framed by two door trims 5 of the front doors. Furthermore, a steering wheel 4 and a center console 6 are indicated.

In the interior of the motor vehicle K, interior lighting 1 is shown, which is formed of a front part 1a and two side parts 1b.

The front part 1a extends in a strip or ribbon-like manner along the dashboard 3, transversely to a longitudinal direction of the vehicle. The two side parts 1b of the interior lighting 1 extend on the door trim 5 in the longitudinal direction of the motor vehicle K. Parts 1b of the interior lighting 1 are also designed in a strip-like or ribbon-like manner. The interior lighting 1 preferably serves as ambient lighting or is designed as such.

Specifically, each part 1a, 1b of the interior lighting 1 is formed of at least one row of illuminants arranged in a plurality side by side.

It is indicated that the interior lighting 1 or its parts 1a, 1b (only indicated for the left side 1b) can be controlled by means of an evaluation and control unit 7. In particular, the illuminants of the interior lighting 1 can be controlled individually or in groups by means of the evaluation and control unit 7.

The figure also indicates a sensor 8 for measuring acceleration and inclination, an infotainment system 9, an acoustic output device 10 and driver assistance systems 11, all of which are connected to the evaluation and control unit 7 via a data bus C. The data bus C can be in the form of a CAN bus, for example.

The sensor 8 can be used in particular to measure acceleration due to gravity, i.e. acceleration to the perpendicular towards the center of the earth. The measurement is also used to derive a positional deviation of the motor vehicle from a horizontal line.

Via the infotainment system 9 or via an input and output unit (e.g. touchscreen), it is possible for an operator to set parameters for visualizing a measured inclination or change in inclination of the motor vehicle K with the aid of the interior lighting 1. Depending on the setting of the parameters (for example, the magnitude of the viscosity of the modeled fluid), physical models stored preferably in the form of characteristic diagrams can then be activated in the evaluation and control unit 7.

Furthermore, it is also conceivable to control the interior lighting 1 via output signals from the driver assistance systems 11, which are made available to the evaluation and control unit 7. Conceivable, for example, are output signals from a front assist or a lane assist which, in dangerous situations, control the interior lighting 1 in such a way that the driver is given a visual warning signal.

Parallel to the control of the interior lighting 1, the evaluation and control unit 7 can also be used to control the acoustic output device 10, which can be designed as a loudspeaker, for example.

Finally, a virtual plane VE is shown which "intersects" the motor vehicle K horizontally and which, purely by way of example, is spanned by lower boundary lines Ua, Ub of part 1a and parts 1b of the interior lighting 1, respectively.

Figure 2:
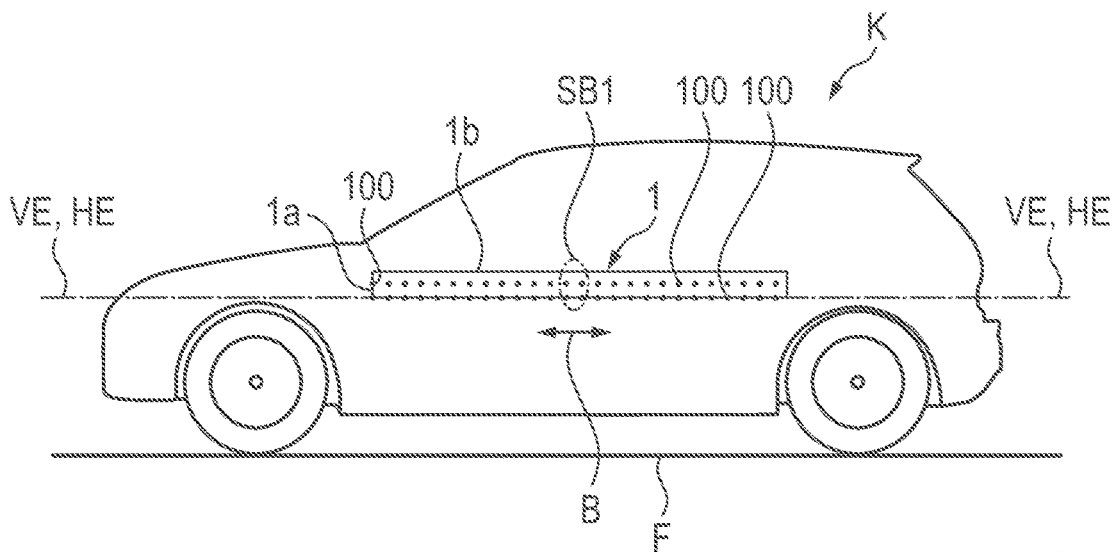
FIG. 2 shows the motor vehicle from the side, in a horizontal position.
Figure 3:
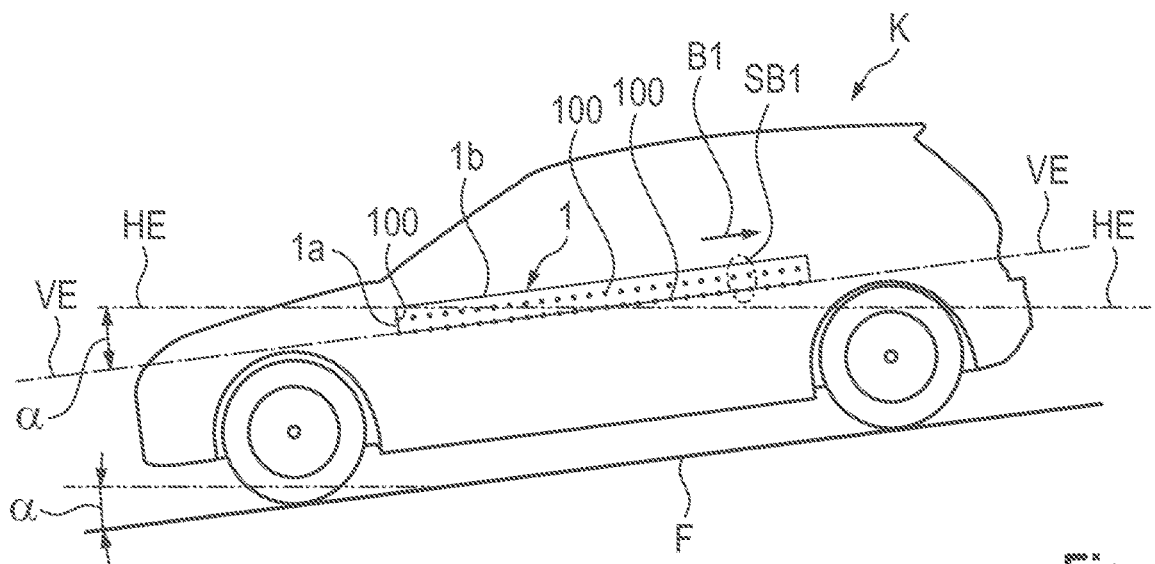
FIG. 3 shows the motor vehicle according to FIG. 2 in a position inclined downhill.

FIG. 2 now shows the motor vehicle K from one side. In this figure, a plurality of illuminants 100 can be seen by means of which the interior lighting 1 or its parts 1a, 1b are respectively formed.

In the exemplary embodiment, the illuminants 100 are preferably designed as light-emitting diodes, particularly preferably as so-called RGB light-emitting diodes, which can emit light in any color. The illuminants 100 are arranged in two rows along parts 1a or 1b of the interior lighting 1.

The virtual plane VE is formed in such a way that it horizontally intersects the motor vehicle K when in a horizontal position, i.e. when the vehicle is on a horizontal roadway F in a horizontal plane HE.

FIGS. 2 to 4A now explain how a measured inclination of the motor vehicle K is made visible in the manner of a spirit level displaying an inclination:

FIG. 2 shows a horizontal travel or position of the motor vehicle K, so that a visualization area SB1 appears in the center of parts 1b of the interior lighting 1. A corresponding visualization area also appears in the center of part 1a of the interior lighting 1.

Specifically, in this operating situation of the motor vehicle K, four illuminants 100 are controlled simultaneously to form the visualization area SB1. However, departing from the exemplary embodiment, a different number of controlled illuminants is also conceivable.

If the motor vehicle K now drives downhill or uphill, the visualization area SB1 is moved in a direction of movement B in the manner of the air bubble of a spirit level as a function of the values measured by the sensor 8 (compare FIG. 1).

For example, if the motor vehicle K travels downhill at an angle of inclination α (compare to FIG. 3), the virtual plane VE and the horizontal plane HE now diverge. The virtual plane VE is raised at the rear end of the interior lighting 1 so that the visualization area SB1 moves in the direction of movement B1. Preferably, the visualization area SB1 moves in its speed of movement, proportional to the magnitude of the angle of inclination α or the magnitude of the change in inclination.

Figure 4A:
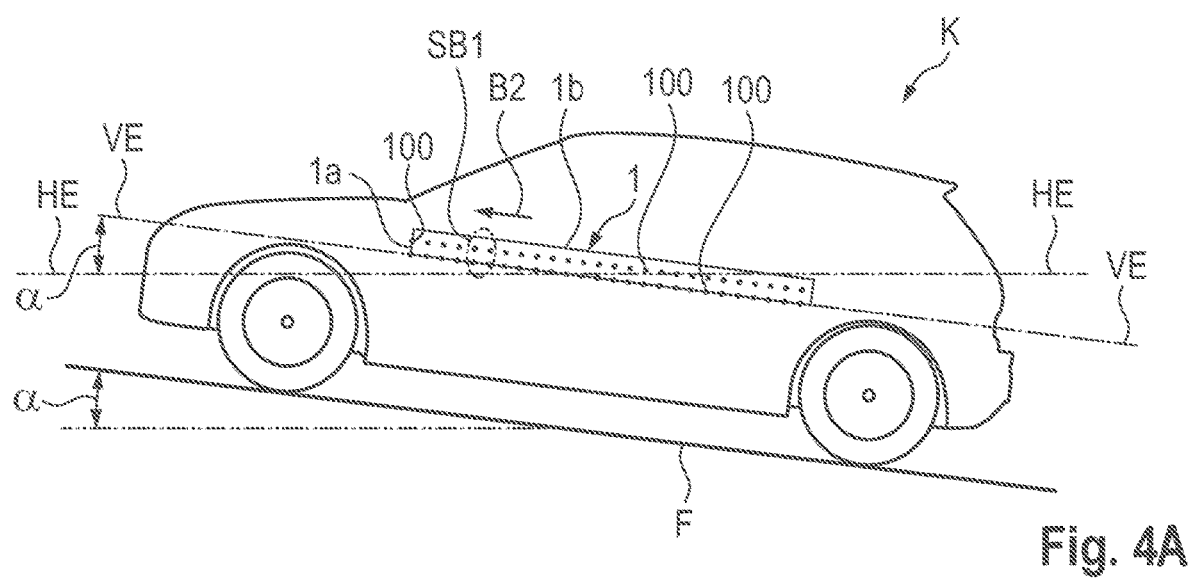
FIG. 4A shows the vehicle according to FIG. 2 in a position inclined uphill.

Similarly, the position of the visualization area SB1 is changed when the motor vehicle K is on a roadway F with an uphill angle of inclination α (compare FIG. 4A). In this case, the illuminants 100 of the interior lighting 1 are controlled in such a way that the visualization area SB1 performs a movement in the direction of movement B2.

The speed of the visualization area SB1 varies in each case as a function of the magnitude of the angle of inclination a or as a function of its change (gradient). Corresponding to the visualization areas SB1 in parts 1b of the interior lighting 1, the visualization area on part 1a of the interior lighting, not visible here, also changes when the motor vehicle K inclines about a longitudinal axis (rolling movements).

If the angle of inclination α in the exemplary embodiment exceeds a certain absolute value in each case, the visualization area SB1 is moved to the outer, respective upper end of the interior lighting 1 and remains there until the angle of inclination a falls below a certain value again.

Departing from the exemplary embodiment, it is also conceivable that in the interior lighting 1, the illuminants 100 are arranged in only one row or in more than two rows.

With reference to FIGS. 4B to 4D, a conceivable variant of the described method is explained using the example of displaying the inclination in the manner of a spirit level. Here, the relationship between an angle of inclination β of the motor vehicle K and the visualization of the inclination by means of a visualization area SB1' on the front part 1a of the interior lighting 1 is illustrated in FIG. 4B (cf. also FIG. 1).

The angle of inclination β is the roll angle of the motor vehicle K. The following explanations can of course also be applied to the representation of the pitch angle of the motor vehicle K.

An intensity I is shown above the angle of inclination β, with which an inclination of the motor vehicle K is displayed. FIG. 4B shows an example of an intensity I that is constant over the entire range of the angle of inclination β. The relationship between the angle of inclination β of the motor vehicle K and the visualization of the inclination by the visualization area SB1' is thus linear.

This means that changes in inclination of the same size Δβ always result in a change in position ΔP of the visualization area SB1' of the same size, regardless of how large the angle of inclination β is. Starting from a horizontal position H of the motor vehicle K, the visualization area SB1' thus moves to the right (positions +P1 to +P4) or to the left (positions −P1 to −P4) in the manner of the air bubble of a spirit level, as a function of the angle of inclination β.

At larger angles of inclination β, this can easily result in that the limit of the physically possible display range is reached on the front part 1a of the interior lighting 1 and that further changes of inclinations can no longer be made visible.

As a possible remedy, FIG. 4C here shows an approach in which the relationship between an angle of inclination β of the motor vehicle K and the visualization of the inclination by the front part 1a of the interior lighting 1 is not linear. In particular, the intensity I in the visualization of the motor vehicle K inclination by the interior lighting steadily decreases in the direction of an increasing inclination or in the direction of an increasing angle of inclination β of the motor vehicle K, starting from a maximum Imax of the intensity I when the motor vehicle K is in a horizontal position H.

Due to such a nonlinear display of the change of inclination, changes of inclination Δβ in the area of the horizontal position H of the motor vehicle K result in larger changes in position (cf. ΔP1) of the visualization area SB1' of the same size than changes of inclinations Δβ in areas with larger angles of inclination β, where the changes in position are smaller (cf. e.g. ΔP4). Compared to a linear progression of the intensity I according to FIG. 4B, some positions (−P1 to −P1', +P1 to +P1', −P2 to −P2', +P2 to +P2', etc.) of the visualization area SB1' are therefore shifted in FIG. 4C despite changes in inclination Δβ of equal size.

The intensity I can also drop off discontinuously in the direction of larger angles of inclination β. FIG. 4D shows that, starting from the horizontal position H, there is initially an intensity I1. When a certain limit value of the angle of inclination β is reached, the intensity I drops abruptly to a lower intensity I2. The decrease in intensity I thus occurs in steps, for example with a step S. Dashed lines on only one side of the angle of inclination β indicate that the decrease in intensity I can also occur in several steps, for example in two steps S1, S2, e.g. from intensity I1 to a lower intensity I2' and finally to intensity I2. This figure also clearly demonstrates that due to the nonlinear progression of the intensity I, the changes in position of the visualization area SB1' result in different sizes in spite of changes of inclination Δβ of the same size in different angular ranges of the angle of inclination β, in particular turn out larger in the range of the horizontal position H than is the case with larger angles of inclination β (cf. ΔP1 and ΔP4).

Figure 5:
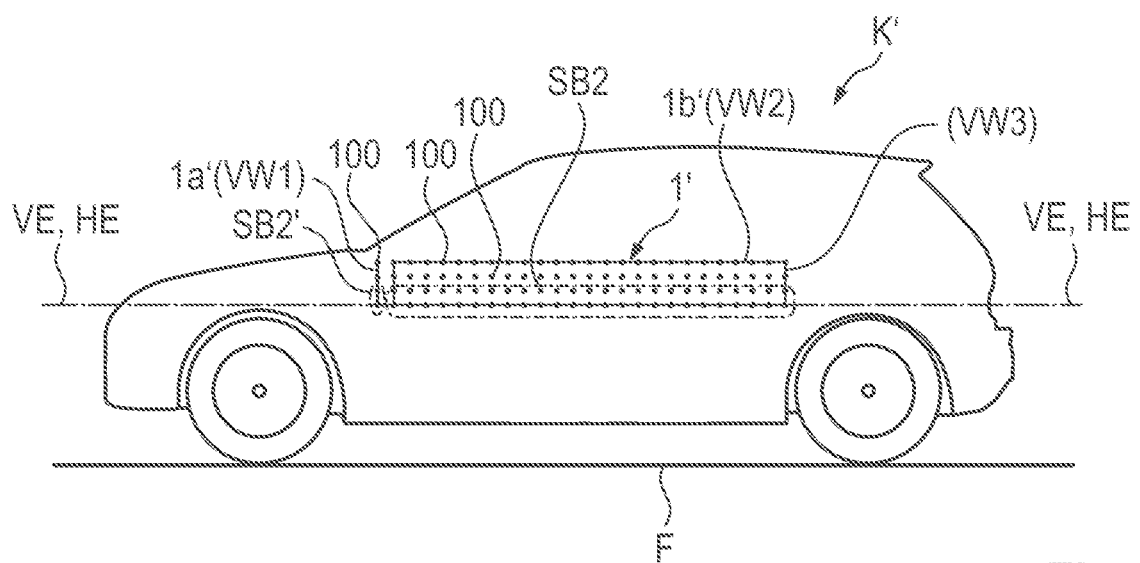
FIG. 5 shows a motor vehicle for carrying out the method, according to a further embodiment, in a horizontal position.
Figure 6:
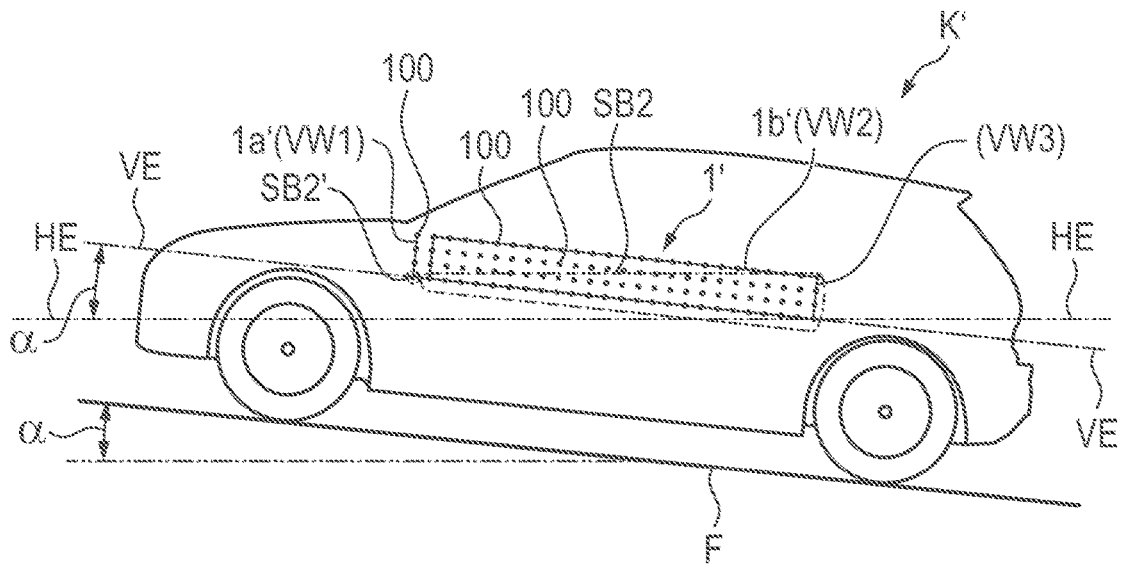
FIG. 6 shows the motor vehicle according to FIG. 5 in a position inclined uphill.
Figure 7:
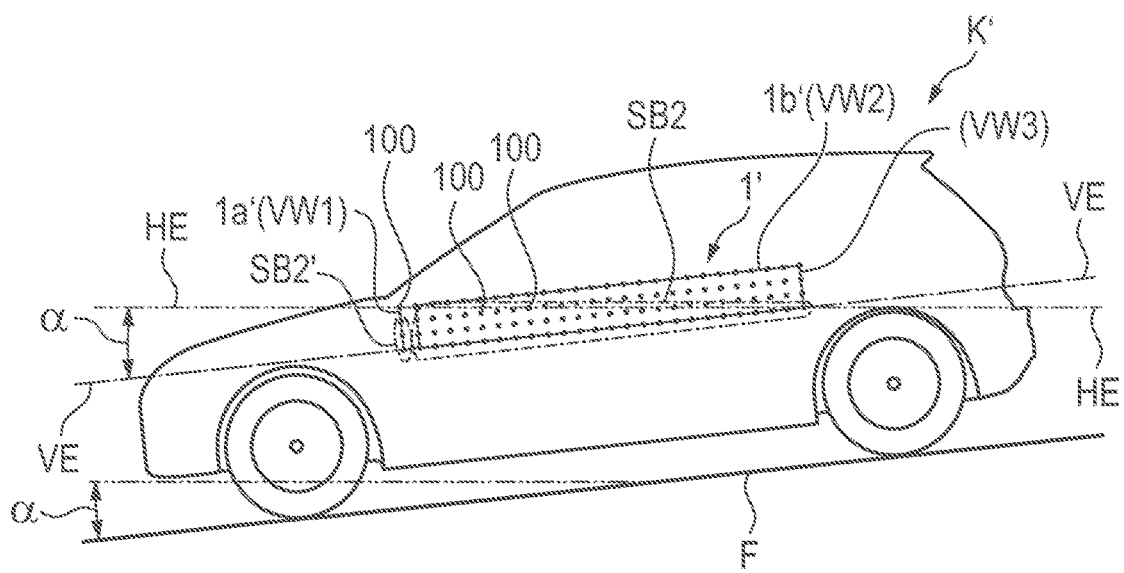
FIG. 7 shows the motor vehicle according to FIG. 5 in a position inclined downhill.

With reference to FIGS. 5 to 7, a motor vehicle K' is now described in which a different embodiment of the method is carried out.

In a departure from the preceding motor vehicle K, the motor vehicle K' has interior lighting 1' with side parts 1b' (on door trim) and a front part 1a' (on the dashboard). In the interior lighting 1', a plurality of illuminants 100 are arranged next to and above each other in a matrix-like manner. This is particularly well illustrated by parts 1b' of the interior lighting 1'.

In FIG. 5, the motor vehicle K' is on a horizontal roadway F, i.e. in a horizontal position. A virtual plane VE, which is laid through the lowest row of illuminants 100 (preferably again RGB light-emitting diodes), in this position once again comes to coincide with a horizontal plane HE.

In the approach now described a measured inclination of the motor vehicle K' is modeled on the motion of a virtual fluid resting on the virtual plane VE and surrounded by an additional, virtual wall. Preferably, the virtual fluid is modeled on the flow behavior of a viscous, i.e. thick, fluid.

In the present embodiment, a virtual wall VW1 is formed by part 1a' of the interior lighting 1' arranged in a dashboard. In addition, two side virtual walls VW2 are formed by two parts 1b' of the interior lighting 1' arranged in the door trim (at least of the front doors).

A third virtual wall VW3, which is opposite the virtual wall VW1, is formed by imaginary connecting lines between illuminants 100 of a last row of parts 1b' of the interior lighting 1'.

In the "tub" formed by the virtual walls VW1, VW2 and VW3, a virtual fluid collects, with a horizontal fluid level, which in the exemplary embodiment is modeled by the lower two rows of the illuminants 100. Thus, in this position, the lower two rows of the illuminants 100 are controlled in such a way that they form an illuminated visualization area SB2 or SB2'. Conversely, it is also conceivable that the visualization areas SB2, SB2' are formed by non-luminous illuminants 100, i.e. in this case only the upper two rows of the illuminants 100 are luminous.

If the motor vehicle K' now moves from the horizontal position to an inclined position, for example on a roadway F inclined uphill with an angle of inclination α, then the virtual fluid in the "tub" moves to such a position as shown in FIG. 6. Here, the visualization area SB2, i.e., the mirror of the virtual fluid, shifts in the direction of the inclined end of the interior lighting 1'.

The figure shows the steady state after changing the position from FIG. 5 to FIG. 6.

It should be noted that, depending on the modeled viscosity of the virtual fluid and depending on the gradient of the change in inclination, different progressions of the virtual fluid occur in the "tub" and thus on the interior lighting 1'.

For this purpose, physical models (for example in the form of characteristic diagrams) are stored in the evaluation and control unit 7 (compare to FIG. 1), which influence the control of the illuminants 100 by the evaluation and control unit as a function of a selected parameter, for example a selected viscosity of the virtual fluid.

The same applies to a change in position of the motor vehicle K' to a position inclined downhill with an angle of inclination α, as shown in FIG. 7.

In contrast to FIG. 6, the virtual fluid collects there at the front, inclined end of the interior lighting 1', i.e. in the area of the virtual wall VW1.

In the exemplary embodiment according to FIGS. 5 to 7, the virtual plane VE drawn through the motor vehicle K' is thus coupled to the motor vehicle K' in terms of movement. Thus, when the motor vehicle K' inclines, the virtual plane VE and the horizontal plane HE diverge.

It is also conceivable that, that in the case of a change in inclination of the virtual plane coupled in terms of movement to the motor vehicle exceeding a certain gradient, a sloshing effect of the virtual fluid impinging against the virtual walls VW1, VW2 and/or VW3 is modeled by activating the illuminants 100 of the interior lighting 1'.

A further conceivable embodiment of the method will now be explained with reference to FIGS. 8 to 10.

The method is again carried out with the motor vehicle K', which has the interior lighting 1' in which the plurality of illuminants 100 are arranged in a matrix-like manner.

FIG. 8 again shows the motor vehicle K' on a horizontal roadway F, in a horizontal position. Furthermore, a virtual plane VE is visible, which in this case coincides with a horizontal plane HE and which is drawn through the interior lighting 1'.

The virtual plane VE forms a dividing line T in the interior lighting 1' which divides the interior lighting 1' in the exemplary embodiment into a lower partial area Tu and an upper partial area To.

A visualization area SB3 is formed by the lower partial area Tu, and a visualization area SB4 is formed by the upper partial area To.

To differentiate between the visualization areas SB3 and SB4, it is conceivable, for example, that the illuminants 100 of the visualization areas SB3, SB4 are controlled in such a way that they light up in different colors and/or with different brightness. By way of pure example, it is conceivable that all illuminants 100 above the dividing line T light up blue, while all illuminants 100 below the dividing line T light up red.

Figure 9:
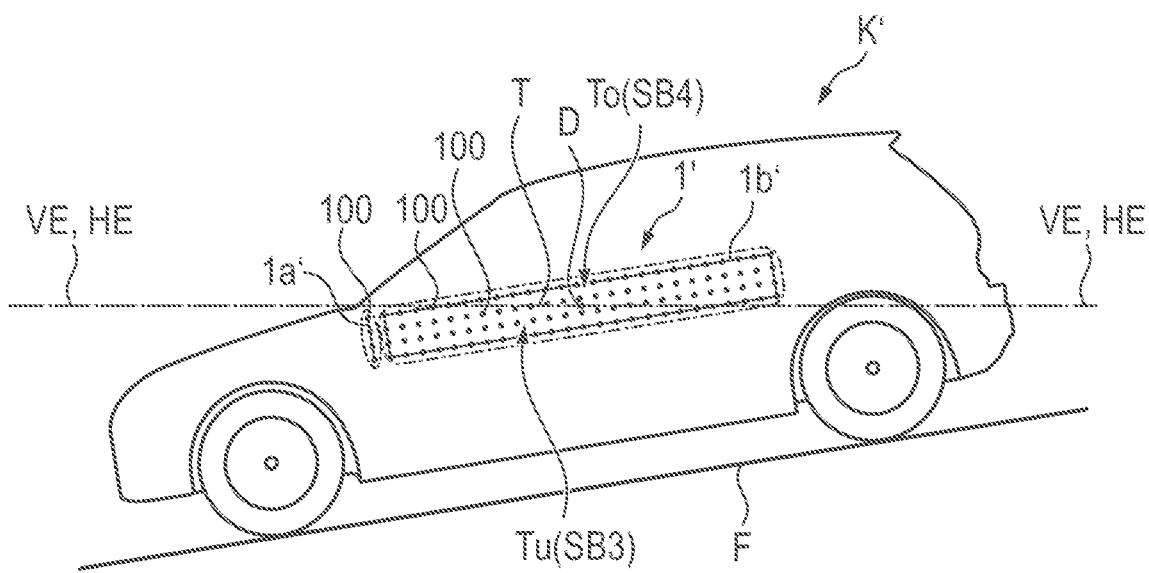
FIG. 9 shows the motor vehicle according to FIG. 8 in a position inclined downhill.

In a roadway F inclined downhill at an angle of inclination α, the motor vehicle K' assumes the position shown in FIG. 9.

It can be seen that in this embodiment of the method the virtual plane VE is shown as a plane that is decoupled in terms of movement from inclination movements (roll and pitch movements) of the motor vehicle K'. This means that the virtual plane VE remains identical or aligned in parallel with a horizontal plane HE even if the motor vehicle K' is inclined.

This has the result that with the downhill inclination, the dividing line T is changed in its position relative to the interior lighting 1'. The dividing line T now optically cuts diagonally through the surface of parts 1b' of the interior lighting 1'. In this case, the dividing line T slopes downward from the front to the rear in relation to the interior lighting 1'.

In the present embodiment, a physical model is stored in the evaluation and control unit 7 that causes a virtual axis of rotation D to run approximately through the surface center of parts 1b' of the interior lighting 1'. However, the axis of rotation D can also be selected in any other way.

Similarly, when the motor vehicle K' is traveling on a roadway F inclined uphill at an angle of inclination α, the dividing line T changes its position relative to the interior lighting 1'. In this case, it rises from the front to the rear in relation to the interior lighting 1'.

Figure 8:
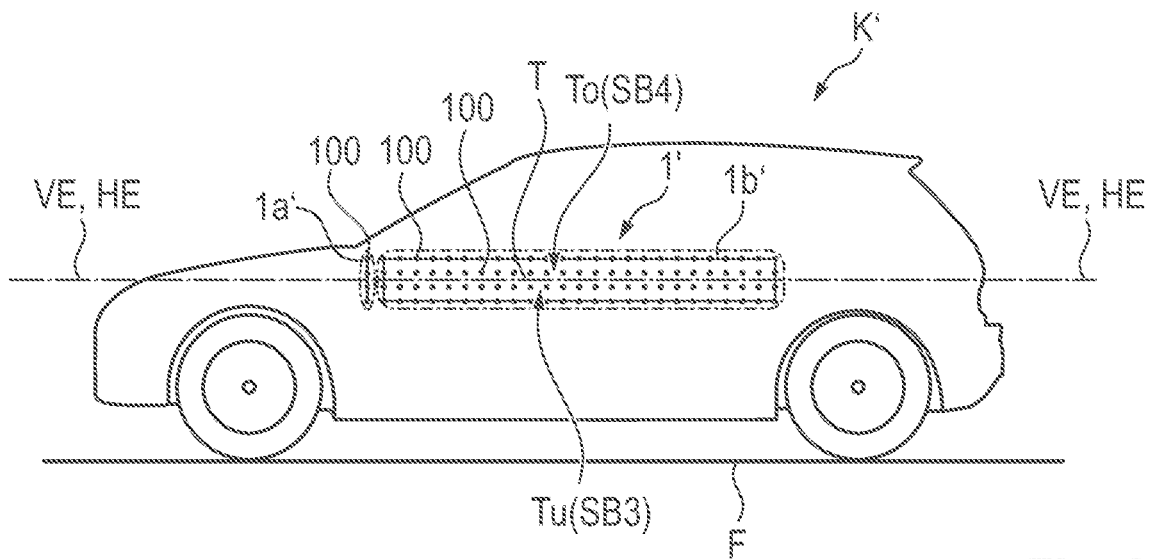
FIG. 8 shows the motor vehicle according to FIG. 5, adapted for carrying out another development of the method, in a horizontal position.
Figure 10:
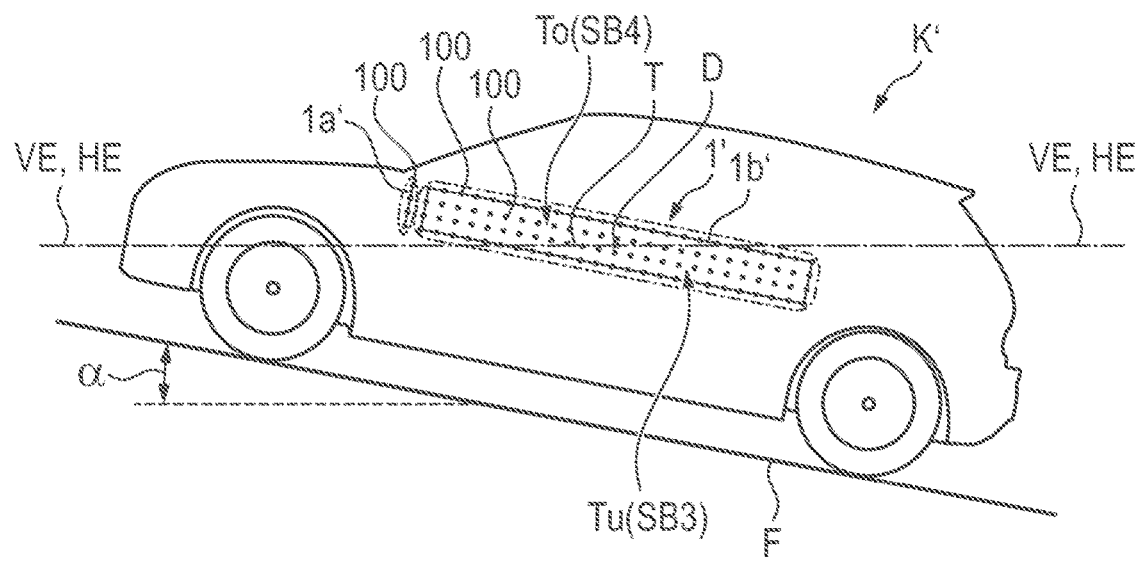
FIG. 10 shows the motor vehicle according to FIG. 8 in a position inclined uphill.
Figure 11:
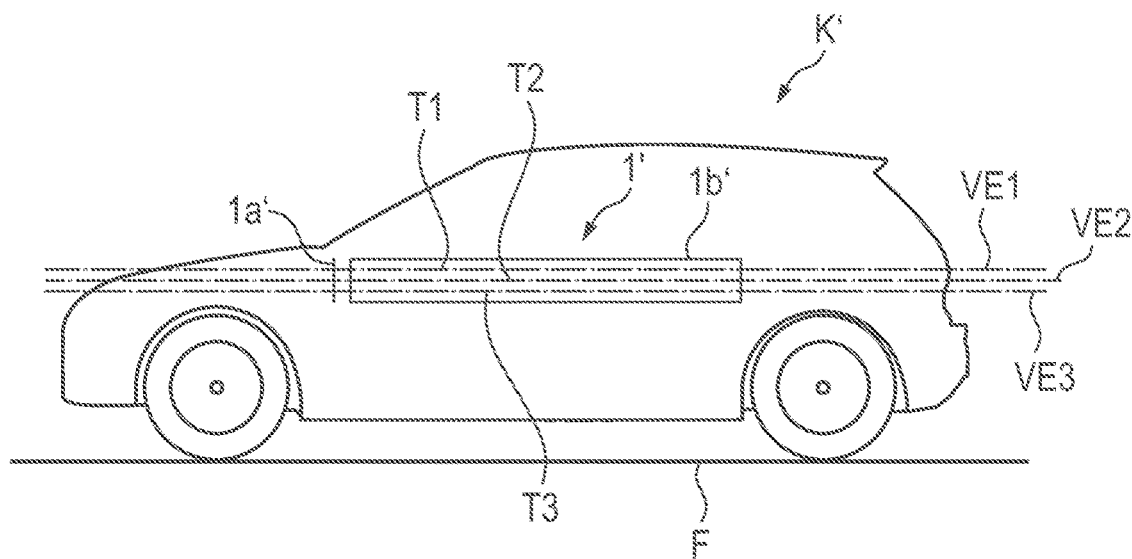
FIG. 11 shows the motor vehicle according to FIG. 8 for carrying out yet another development of the method.

Finally, it should be pointed out with reference to FIG. 11 that it is also conceivable, as an extension of the approach described in FIGS. 8 to 10, to "cut through" the motor vehicle K' with several virtual planes, for example VE1 to VE3, and to stack them formally one on top of the other. A vertical distance between the virtual planes VE1 to VE3 of about 10 cm can be selected purely by way of example.

As a result, the interior lighting 1' is interspersed with dividing lines T1, T2 and T3. Analogous to the illustration according to FIGS. 8 to 10, the dividing lines T1 to T3 again form different partial areas or visualization areas that can light up in different colors and/or brightnesses.

When forming multiple virtual planes, it is appropriate to correspondingly increase the number of illuminants 100 (not shown in this figure) of the interior lighting 1'.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for visualizing an inclination of a motor vehicle in the motor vehicle, the method comprising:
   measuring the inclination of the motor vehicle;
   making the inclination visible in an interior of the motor vehicle via interior lighting arranged in the motor vehicle;
   forming at least one virtual plane that intersects the motor vehicle horizontally when the vehicle is in a horizontal position and serves as a reference plane for a display of the inclination; and
   modeling dynamically changes in the inclination of the motor vehicle by the interior lighting by a sequential and/or a parallel activation of illuminants of the interior lighting,
   wherein the illuminants are only activated when a specific, first inclination limit value is exceeded.

2. The method according to claim 1, wherein the inclination of the motor vehicle is made visible in the manner of a spirit level displaying an inclination, wherein a movement of an air bubble in a fluid of a spirit level is modeled by at least one visualization area produced by activating the illuminants, which visualization area moves analogously to the air bubble counter to the direction of inclination of the virtual plane when the virtual plane, which is coupled to the motor vehicle in terms of movement, inclines.

3. The method according to claim 2, wherein the visualization area is formed by a luminous and/or colored highlighted area.

4. The method according to claim 2, wherein the visualization area is formed by a non-luminous area.

5. The method according to claim 1, wherein the visualization of the inclination of the motor vehicle is acoustically accompanied.

6. The method according to claim 1, wherein the relationship between the inclination of the motor vehicle and the visualization of the inclination by the interior lighting is nonlinear.

7. The method according to claim 6, wherein an intensity in the visualization of the inclination of the motor vehicle by the interior lighting decreases in the direction of an increasing inclination of the motor vehicle, starting from a maximum of the intensity when the motor vehicle is in the horizontal position.

8. The method according to claim 7, wherein the decrease in intensity is continuous, at least in some areas.

9. The method according to claim 7, wherein the decrease in intensity takes place in steps, at least in some areas.

10. A motor vehicle for carrying out the method according to claim 1, the motor vehicle comprising:
    interior lighting arranged in a passenger compartment, the interior lighting comprising at least one row of a plurality of horizontally aligned illuminants arranged next to one another; and
    at least one control unit to activate the illuminants as a function of values measured by at least one sensor,
    wherein an inclination value of the motor vehicle is detected by the at least one sensor, and
    wherein the illuminants of the interior lighting are adapted to be activated sequentially and/or in parallel as a function of the detected inclination such that at least one visualization area, which changes with changing inclination, is produced.

11. The motor vehicle according to claim 10, wherein the interior lighting comprises multiple rows of the plurality of horizontally aligned illuminants arranged side by side such that a matrix-like arrangement of the illuminants results.

12. The motor vehicle according to claim 10, wherein the interior lighting is arranged at least along an interior trim of the front doors and along a dashboard.

13. The motor vehicle according to claim 10, further comprising at least one acoustic output device in the interior of the motor vehicle and at least one control unit for activating the acoustic output device as a function of values measured by the at least one sensor.

14. A method for visualizing an inclination of a motor vehicle in the motor vehicle, the method comprising:
    measuring the inclination of the motor vehicle;
    making the inclination visible in an interior of the motor vehicle via interior lighting arranged in the motor vehicle;
    forming at least one virtual plane that intersects the motor vehicle horizontally when the vehicle is in a horizontal position and serves as a reference plane for a display of the inclination; and
    modeling dynamically changes in the inclination of the motor vehicle by the interior lighting by a sequential and/or a parallel activation of illuminants of the interior lighting,
    wherein the visualization of the inclination of the motor vehicle is modeled on the movement of a virtual fluid resting on the virtual plane and surrounded by a virtual wall, wherein the virtual fluid, which changes position as the inclination of the virtual plane coupled in terms of movement to the motor vehicle changes, is modeled by at least one visualization area which is produced by the sequential and/or simultaneous activation of illuminants of the interior lighting and which moves in the direction of the inclination of the virtual plane towards the virtual wall and/or collects in the area of the virtual wall.

15. The method according to claim 14, wherein, in the case of a change in inclination of the virtual plane exceeding a certain gradient, a sloshing effect of the virtual fluid impinging against the virtual wall is modeled by activating the illuminants of the interior lighting.

16. A method for visualizing an inclination of a motor vehicle in the motor vehicle, the method comprising:
    measuring the inclination of the motor vehicle;
    making the inclination visible in an interior of the motor vehicle via interior lighting arranged in the motor vehicle;
    forming at least one virtual plane that intersects the motor vehicle horizontally when the vehicle is in a horizontal position and serves as a reference plane for a display of the inclination; and
    modeling dynamically changes in the inclination of the motor vehicle by the interior lighting by a sequential and/or a parallel activation of illuminants of the interior lighting,
    wherein the at least one virtual plane is displayed by the interior lighting as a plane which is decoupled in terms of movement from inclination movements of the motor vehicle such that when the motor vehicle is not inclined, the interior lighting is separated horizontally by the virtual plane into a first partial area located above the plane and a second partial area located below the plane, wherein the first and second partial areas are displayed differently, and wherein a position of a dividing line formed through the virtual plane between the first and second partial areas is changed relative to the interior lighting when the motor vehicle is inclined.

17. The method according to claim 16, wherein multiple virtual, horizontal planes are displayed by the interior lighting as planes decoupled in terms of movement from inclination movements of the motor vehicle.

\* \* \* \* \*